United States Patent [19]

Kawauchi

[11] Patent Number: 5,264,771
[45] Date of Patent: Nov. 23, 1993

[54] STEPPING MOTOR CONTROL SYSTEM

[75] Inventor: Takahiro Kawauchi, Furukawa, Japan

[73] Assignee: Alps Electric Co., Ltd., Tokyo, Japan

[21] Appl. No.: 882,789

[22] Filed: May 14, 1992

[30] Foreign Application Priority Data

May 20, 1991 [JP] Japan .................. 3-142630

[51] Int. Cl.$^5$ ............................. H02P 8/00
[52] U.S. Cl. ........................ 318/696; 318/685
[58] Field of Search ................... 318/696, 685

[56] References Cited

U.S. PATENT DOCUMENTS

| | | | |
|---|---|---|---|
| 4,775,825 | 10/1988 | Moribe et al. ............ | 318/696 |
| 4,988,938 | 2/1991 | Ito et al. . | |
| 5,001,410 | 3/1991 | Ono ....................... | 318/696 |
| 5,032,779 | 7/1991 | Takahashi ................ | 318/696 |
| 5,041,773 | 8/1991 | Takahashi ................ | 318/696 |

Primary Examiner—William M. Shoop, Jr.
Assistant Examiner—Karen Masih
Attorney, Agent, or Firm—Guy W. Shoup; David W. Heid

[57] ABSTRACT

The invention concerns with a system for controlling a stepping motor, and more particularly with a stepping motor control system which moves a head of a disk drive unit with (1-2)-phase excitation. With the stepping motor controlling system, a driving force is produced to rotate the stepping motor by a predetermined angle with the (1-2)-phase excitation for ech step pulse supplied from the exterior, and step pulses with a plurality of cycles are used to make the stepping motor rotate at different speeds depending on the cycles of the step pulses. In that controlling system, a time period of the 1-phase excitation is changed depending on the pulse interval of the step pulses, thereby reducing a level of noisy sounds like seek noise.

4 Claims, 3 Drawing Sheets

STEPPING MOTOR CONTROL SYSTEM

BACKGROUND OF THE INVENTION

1. Field of the Invention

The present invention relates to a stepping motor control system used in a disk drive unit for moving a head in the seek operation.

2. Description of the Prior Art

In a disk drive unit, when accessing to desired one of tracks concentrically formed on a disk such as a floppy disk which is placed on a turntable for rotation therewith, a seek operation is performed to move a head up to the desired track in the radial direction of the disk at a high speed. The head is mounted on a head carriage and a needle (drive pin) attached to the head carriage engages a lead screw rotatable by a stepping motor. When the lead screw is rotated by the stepping motor, the needle moves in the axial direction of the lead screw, whereby the head carriage and hence the head are moved in the radial direction of the disk.

In such a disk drive unit, the stepping motor is rotated in response to a command from the host side. The command is given in the form of pulses (step pulses). For each step pulse, the stepping motor rotates to such an extent that the head is moved by one track pitch. Accordingly, when step pulses are successively sent, the stepping motor rotates by a predetermined angle per pulse so that the head is moved in a one-track by one-tack basis. A seek speed of the head is determined by the cycle of the step pulses. While the pulse cycle may be set to various values, the drive unit for floppy disks sets about 3 msec as the shortest cycle of the step pulses and employs cycles of about 3 msec, about 6 msec, about 12 msec, etc. The host side sends the step pulses of various cycles, whereupon the disk drive unit exhibits a seek speed different for each cycle.

FIG. 4 shows changes in a head position during the seek operation.

In FIG. 4, when now accessing to a track with its center indicated by a one-dot-chain line, the head is moved with the seek operation along a locus, indicated by a solid line a, to be drawn into the target track. However, because of undergoing an external load, a stepping motor can no longer be driven in an angular range where the torque becomes smaller than a predetermined value. This range is called a dead zone and illustrated as locating on a disk in FIG. 4. When the head is moved along the solid line a and comes into the dead zone, the stepping motor loses its driving force and the head goes beyond the dead zone due to inertia of the head carriage and the stepping motor. This causes the stepping motor to produce a driving force in a direction of reversal of the above step from the relationship between magnetic poles and excitation phase signals of the stepping motor, whereby the head is moved back toward the center of the target track. The head therefore enters the dead zone, but goes beyond the same again, causing the stepping motor to produce a driving force in a direction of reversal of the above step. In this way, as indicated by a solid line b, the head position oscillates while going into and out of the dead zone, and the amplitude of the oscillation gradually damps so that the head position is finally stabilized in the dead zone. Such oscillation is called settling. The occurrence of settling gives rise to problems as follows.

(1) When the head intersects the track during the seek operation, there occurs seek noise which generates undesired noisy sounds.

Now taking a drive unit for floppy disks as an example, the drive unit is set such that when the seek operation is performed by supplying the step pulses with the shortest cycle of about 3 msec, the locus of head movement in the vicinity of the track follows the solid line a and then a broken line c in FIG. 4 without causing any settling. On the contrary, when the seek operation is performed by supplying the step pulses with the cycle of about 6 msec, because of the step pulse cycle being longer than about 3 msec, the head approaches the track along the solid line a, but upon going beyond the track, it follows the solid line b to cause the settling. The next step pulse is supplied during the settling and, therefore, the head now moves along a broken line d. When the head is shifted from the locus of the solid line b to the locus of the broken line d upon supply of the step pulse, the stepping motor produces a so large driving force that the direction of movement of the head is abruptly reversed to thereby cause seek noise.

Heretofore, there is known a technique adapted to prevent noise which occurs when the rate of step pulses is almost equal to the natural oscillation frequency of a stepping motor. With this technique, by always monitoring the cycle of step pulses, when the cycle is not included in a range corresponding to the natural frequency, excitation pulses of A and B phases for the stepping motor are normally controlled; i.e., the polarity of the A-phase pulse is reversed at the timing of each step pulse and the polarity of the B-phase pulse is reversed with a delay of certain time t from the timing of each step pulse. Thus, the stepping motor is excited in a normal manner. On the other hand, when the step pulse cycle is included in the above range, a reverse excitation phase pulse having opposite polarity to the A-phase pulse (namely, in a direction of reversely rotating the stepping motor) is added to the A-phase pulse at the timing of a peak of the solid line b in FIG. 4 between the timing of each step pulse and the reversal timing of the polarity of the B-phase pulse, and a reverse excitation phase pulse having opposite polarity to the B-phase pulse (namely, in a direction of reversely rotating the stepping motor) is added to the B-phase pulse at the timing of a next peak of the solid line b in FIG. 4 after reversal of the polarity of the B-phase pulse. Adding the reverse excitation phase pulses as mentioned above implies that the step pulse cycle is essentially divided by the reverse excitation phase pulses. As a result, the step pulse cycle departs away from the natural oscillation frequency of the stepping motor to reduce a level of noise.

However, the above prior art requires it to always monitor the cycle of step pulses and perform a process of adding or not the reverse excitation phases pulse to the excitation phases depending on the cycle, thus making the process complicated.

Also, in the above prior art, the reverse excitation phase pulses are added with an intention of braking the stepping motor to suppress the amplitude of the settling. Even by so controlling, however, when the head is moved along the solid line a and then the broken line d shown in FIG. 4 for seeking, the seek noise produced upon shifting of the head from the solid line b to the broken line d cannot be suppressed sufficiently.

(2) When accessing to a desired track, there occurs such hysteresis that the head is stopped at different positions in the direction of width of the track depending on the direction of seeking (i.e., the direction of movement of the head).

When the head is drawn into the desired track after the seek operation, the head is stopped after being subjected to settling as represented by the solid line b in FIG. 4. At this time, owing to the load applied to a rotor of the stepping motor, the head is not always stopped such that its center aligns with the center of the track, and both the centers are not coincident with each other in usual cases. Supposing now in FIG. 5 that the head is moved toward a desired track nTK to be accessed along a solid line a from a track $(n-1)$TK on one side, the head is stopped after the above-mentioned settling. Conversely, supposing that the head is moved toward the desired track nTK along a solid line a' from a track $(n+1)$TK on the other side, the head is also stopped after the settling as shown. It is however general that the centers of the heads thus moved and stopped do not align with the center of the track nTK and take arbitrary positions in the dead zone, meaning that the head stop positions are not coincident with each other. This phenomenon is called hysteresis. With the presence of such hysteresis, the head stop positions are offset from the track center and also from each other. For a floppy disk of 3.5 inch, the dead zone amounts to 20 to 30% of width of each track and, therefore, the head exhibits off-track on the same order in the worst case. The off-track amount is further increased depending on expansion of disks due to changes in temperature and service life of the stepping motors.

To eliminate the hysteresis, the following technique is proposed in the prior art. When the head is moved toward the desired track nTK in one direction as indicated by the solid line a in FIG. 5, it is stopped like conventionally, namely, as indicated by the solid line a in FIG. 5. On the other hand, when the head is moved toward the desired track nTK in the opposite direction as indicated by the solid line a' in FIG. 5, the stepping motor is further driven to move by another track pitch after reaching the desired track nTK. Upon the head being stopped in the adjacent track, the stepping motor is now driven in a direction of reversal to the above, causing the head to be drawn into the desired track. Thus, irrespective of the direction of seeking, the head is finally drawn into the desired track along the solid line a in FIG. 5 and the head stop positions are coincident with each other.

With that conventional technique, however, when the head is moved in the opposite direction for seeking, an extra time is necessary for the head to reciprocate one track pitch, which prolongs an access time. Some hosts require read/write immediately after sending the step pulses corresponding to the seek distance. Such requirement in those hosts cannot be met if the head is moved to reciprocate one additional track pitch as stated above.

Meanwhile, as also shown in FIG. 5, when the seek operation of the carriage is performed by using the stepping motor with the step pulses SP of short cycle, the locus of head movement in the vicinity of the track follows the solid line a and then a broken line b without causing any settling. On the contrary, when the seek operation of the carriage is performed with the step pulses of long cycle, the head approaches the track along the solid line a, but upon going beyond the track, it follows a solid line d to cause the settling. The next step pulse is supplied during the settling and, therefore, the head now moves along a solid line c. When the head is shifted from the locus of the solid line d to the locus of the solid line c, the stepping motor produces a so large driving force that the direction of movement of the head is abruptly reversed to thereby cause seek noise.

As explained above, the conventional system for controlling a stepping motor suffers from the problems of causing hysteresis in the head stop positions with respect to a target track and producing seek noise upon supply of a step pulse during the settling. In particular, with the stepping motor having small size and hence small inertia, seek noise generated in the seek operation may be increased because of a resonance phenomenon during the driving of the carriage. This is likely to occur when the interval of step pulses is almost equal to the natural oscillation frequency of the stepping motor or the frequency of a fraction thereof.

SUMMARY OF THE INVENTION

The present invention has been made in view of the state-of-art of systems for exciting stepping motors as set forth above, and its main object is to provide a stepping motor exciting system which can suppress the occurrence of seek noise in a small-sized stepping motor.

The above object is achieved by a system for controlling a stepping motor which produces a driving force to rotate itself by a predetermined angle with (1-2)-phase excitation for each step pulse supplied from the exterior, exhibits rotary oscillation gradually damping until supply of a next step pulse after rotating by a predetermined angle for each of step pulses with a plurality of cycles, and rotates at different speeds depending on the cycles of the step pulses, wherein a time period of the 1-phase excitation is changed depending on the pulse interval of the step pulses.

Thus, in the (1-2)-phase excitation effected corresponding to the step pulses, the excitation time (end timing) of the 1-phase (A-phase) excitation is selected to an optimum value depending on the interval of the step pulses, whereby the settling of the stepping motor is so suppressed that the seek operation may be performed with a great reduction in seek noise and the head can be moved for the seek operation.

DETAILED DESCRIPTION OF PREFERRED EMBODIMENT

Figure 1:
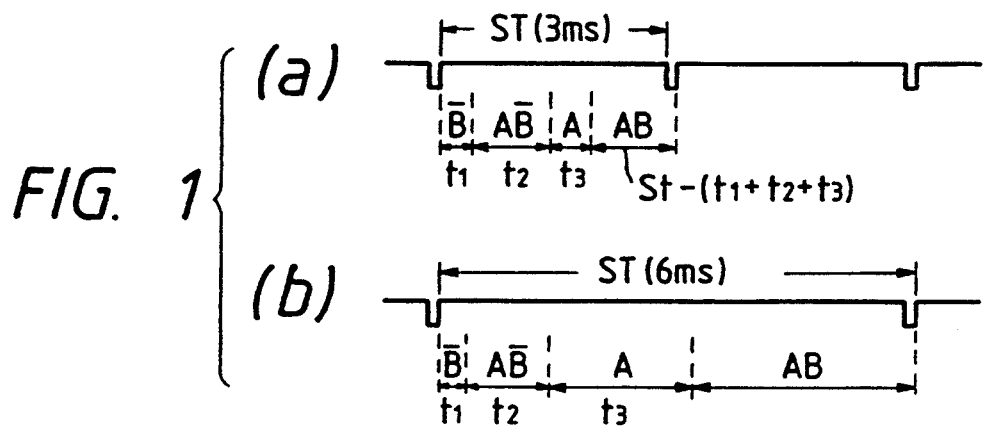
FIG. 1 is an explanatory diagram showing one embodiment of the present invention.

Hereinafter, one embodiment of the present invention will be described with reference to FIGS. 1 to 3 in which; FIG. 1 is a diagram for explaining the principles based on which excitation timing is determined in the embodiment, FIG. 2 is a timing chart showing an operation of the embodiment, and FIG. 3 is a waveform graph of the driving of a stepping motor with a time period of 1-phase excitation set as a parameter according to the embodiment.

In the embodiment, as shown in FIG. 1, (1-2)-phase excitation for a stepping motor is performed as follows. An excitation time t1 in $\overline{B}$ phase and an excitation time t2 in $A\overline{B}$ phase are each set to a certain value. An excitation time t3 in A phase is switchingly set to 1.8 ms when an interval ST of step pulses SP is in the range of 3.75 ms<ST<13.75 ms, or 0.5 ms when the interval ST of the step pulses SP is outside the above range. With the excitation time t3 in A phase changed, as will be seen from FIG. 3, there is such a tendency that the waveform of locus of a head (carriage) driven by the stepping motor exhibits a large overshoot at a small value of the excitation time t3, but the overshoot is gradually reduced as the excitation time t3 increases. In the embodiment, by way of example, the interval ST of the step pulses SP is set to either 3 ms or 6 ms. To make the carriage follow the short interval ST, the carriage is required to be rapidly sped up in the rising stage. However, the rapid rising of the carriage increases the overshoot, thereby increasing the speed at which the carriage is moved back toward a desired track. Accordingly, whether the above-mentioned shift from one locus to another locus is smoothly made, or the stepping motor is forced to produce a large driving force with increased seek noise depends on to which position is applied a next step pulse along a slope of the curve of locus waveform determined by selection of the excitation time t3 in A phase. This embodiment is arranged such that an internal timer is provided to count the interval ST of the step pulses SP and, based on a counted value of time, the excitation time t3 in A phase is set to either 1.8 ms or 0.5 ms.

Figure 2:
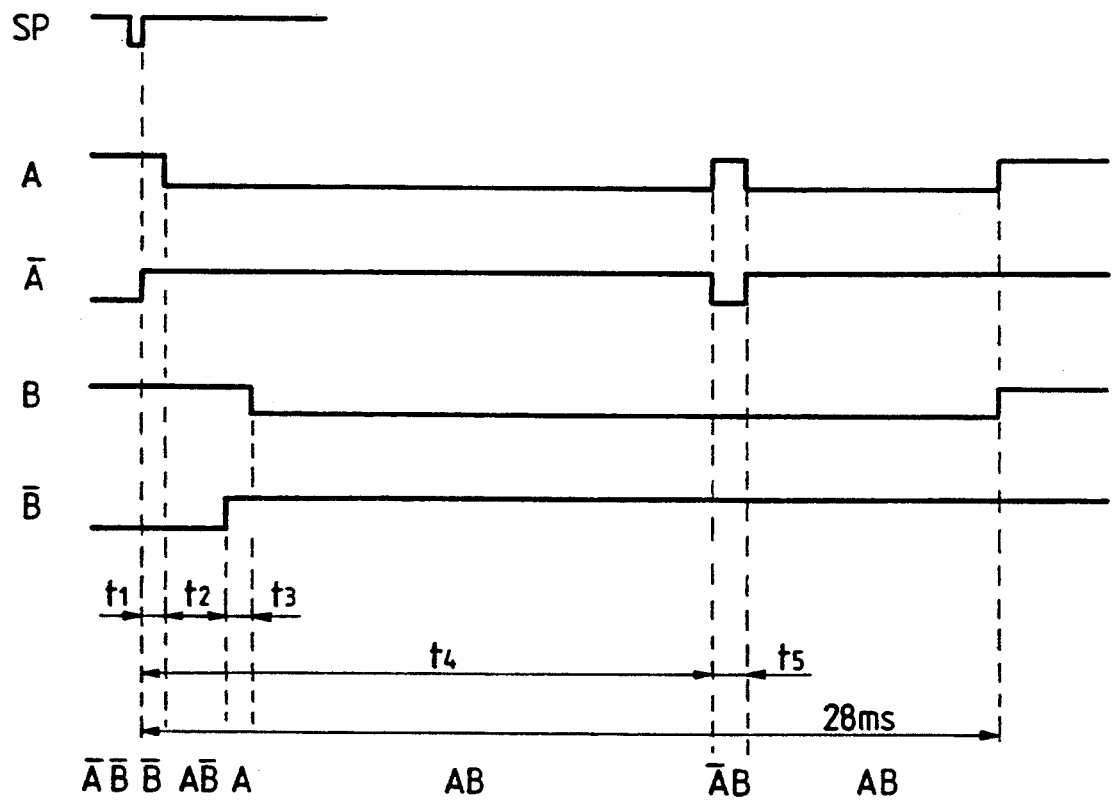
FIG. 2 is a timing chart showing an operation of one embodiment of the present invention.
Figure 3:
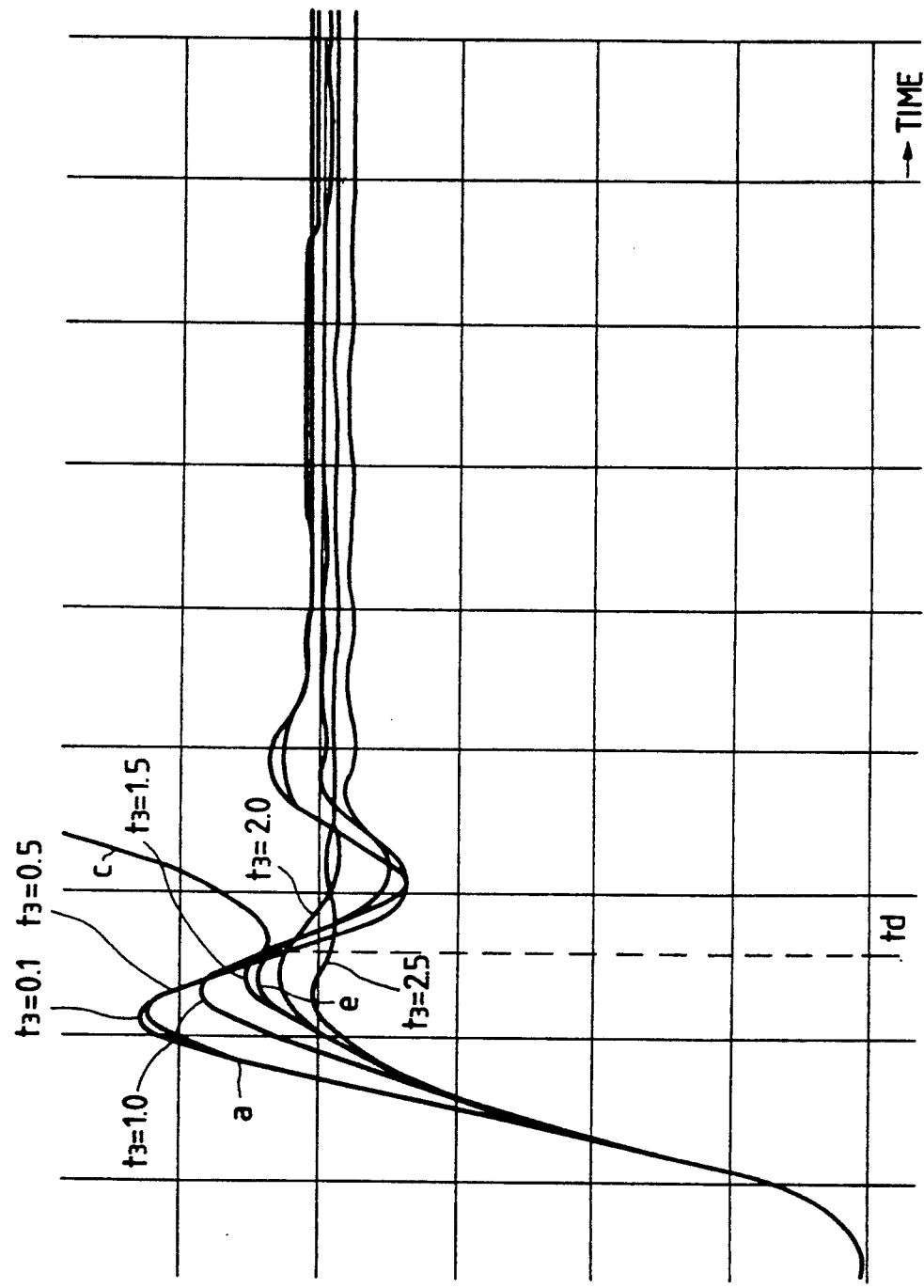
FIG. 3 is an explanatory graph showing a settling curve with a 1-phase excitation time in (1-2)-phase excitation set as a parameter according to one embodiment of the present invention.
Figure 4:
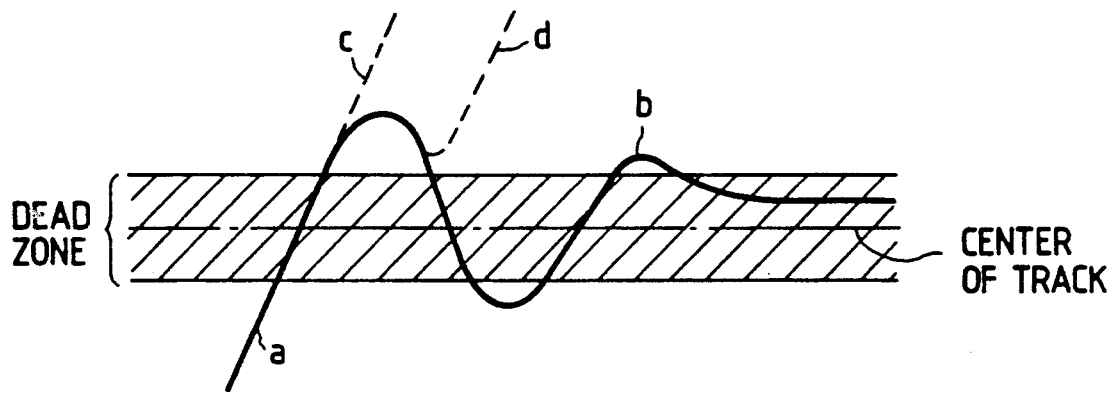
FIG. 4 is a diagram for explaining settling of a stepping motor and the cause of seek noise.

For various excitation times, including the excitation time in A phase, shown in FIG. 2, the inventors repeated experiments in consideration of various conditions and derived optimum setting values. This process was on the basis of premises below: (1) The stepping motor shall not be out of synchronism;

(2) The seek settling time shall be less than 18 ms; and (3) The hysteresis shall be less than 5 μm (about 12%).

As explained before, when the stepping motor is subjected to (1-2)-phase excitation to move a head for seeking a target track, the stepping motor causes hysteresis in its stop positions within the dead zone because of specific characteristics. To avoid such hysteresis, this embodiment is arranged such that once stopped, the excitation phase for the stepping motor is switched over for driving the stepping motor again to escape it from the dead zone, and that the direction and the speed at which the stepping motor enters the dead zone again are set to be the same irrespective of the direction of entering the dead zone for the first time, thereby causing the stepping motor to stop at almost the same position. In consideration of correspondence between the track and the excitation phase for that positioning excitation, the phases effective to switch over the excitation phase are fours, i.e., inverted $\overline{AB}$ phase, B phase, A phase and $\overline{B}$ phase, when the head is on the target track nTK. In this embodiment, the $\overline{AB}$ phase and the B phase relating to the inner direction are selected to avoid an adverse influence on a 0 track sensor. Of these two phases, owing to the fact that the torque produced with the single phase is too small to rotate the stepping motor, the excitation phase is switched over in the $\overline{AB}$ phase. Thus, an excitation time t5 in inverted $\overline{AB}$ phase is set as shown in FIG. 2.

Figure 5:
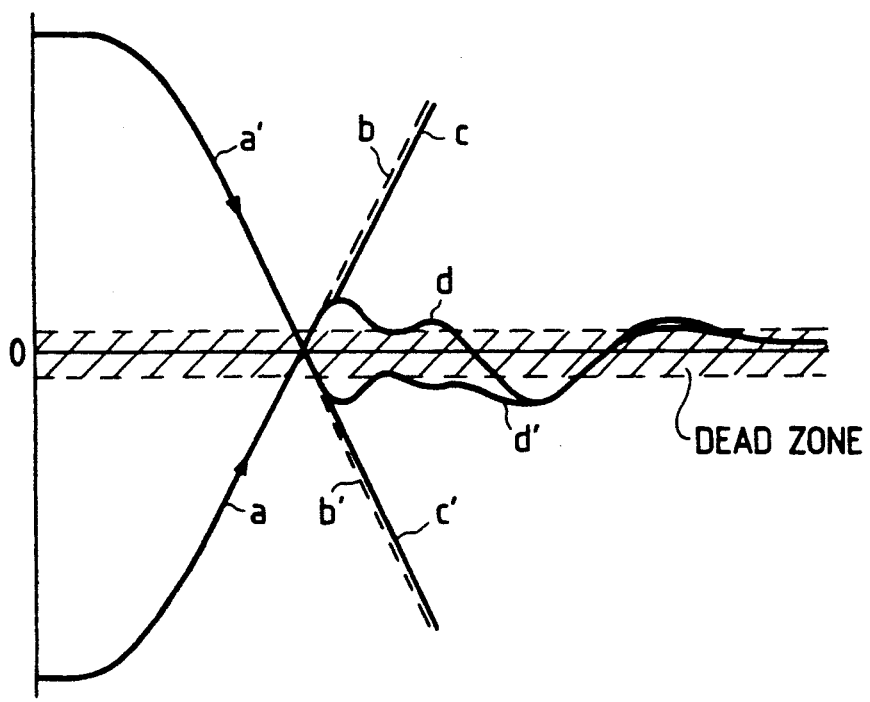
FIG. 5 is a diagram showing a hysteresis phenomenon of the stepping motor.

Specifically, in this embodiment, after the final step pulse is supplied for the seek operation of the magnetic head, the excitation in $\overline{AB}$ phase is performed for the excitation time t5 to drive the stepping motor, whereby the head is forcibly moved downwardly in FIG. 5 along the solid line d. At this time, irrespective of in which direction the head is driven to move toward the desired track, the loci indicated by the solid lines d, d' are located on the same side of the dead zone and are substantially coincident with each other after the excitation in $\overline{AB}$ phase. In other words, irrespective of from which side the head enters the dead zone, the head is moved at the same speed following substantially the same locus. Based on such a basic condition that the above positioning excitation is performed after the head has perfectly stopped, the inventors repeated experiments under various conditions and derived optimum values of the starting time t4 and the excitation time t5 in $\overline{AB}$ phase.

More specifically, in FIG. 2, the starting time t4 from input of the step pulse SP to the positioning excitation is desired to be as small as possible from the condition that the seek settling time shall be 18 ms, but it was set to 10 ms with some margin in view of 8.3 ms in the type that includes no positioning excitation. As to the hysteresis, by making the excitation time t5 longer to increase the off-track amount, the speeds at which the stepping motor enters the dead zone again can be more equalized. From the standpoint of reducing the seek settling time and prevention out-of-synchronism, however, the excitation time t5 is preferably short to a minimum. Taking those factors into account, the excitation time t5 was set to 0.6 ms. Thus, in the embodiment, the excitation times t1, t2, t3, t5 in respective phases and the starting time t4 were set as shown in Table 1.

TABLE 1

| ST | t1 | t2 | t3 | t4 | t5 |
| --- | --- | --- | --- | --- | --- |
| ≦ 3.75 ms or ≧ 13.75 ms | 0.4 | 1.0 | 0.5 | 10 | 0.6 |
| 3.75 ms to 13.75 ms | | | 1.8 | | |

Operation of the embodiment will be next described. By setting t1=0.4 ms, t2=1.0 ms, t5=0.6 ms for the excitation times in respective phases, t4=10 ms for the starting time and t3=0.5 ms at the start-up, as shown in Table 1, the stepping motor is excited to drive for moving the head in the radial direction of the track. With t3= 0.5 ms set at the beginning, the head moving the head in the radial direction of the track gives rise to a large overshoot as indicated by a curve a in FIG. 3. Then, a next step pulse is applied at the time td, for example, causing the head to move toward the next track along a curve c. On this occasion, since the curve of head locus shows a large change in direction, the stepping motor is forced to produce a large driving force and hence seek noise.

In the embodiment, the internal timer starts counting at the time the first step pulse is generated, and determines the interval ST of the step pulses by detecting the generation of the next step pulse. Given ST=10 ms, for example, the excitation time t3 is now set to 1.8 ms. Accordingly, from the subsequent seek operation toward the next track, the curve of head locus is given as shown by a curve e in FIG. 3. Upon the step pulse being generated at the time td, the head can smoothly move toward the subsequent track along the curve c without changing the direction of the locus curve to a large extent. Therefore, the stepping motor is not forced to produce a large driving force, allowing the head to move from one track to another with no seek noise. Additionally, since the excitation time t5 is set so as to avoid resonance with the natural oscillation frequency of the stepping motor, the occurrence of a detrimental resonance phenomenon in the driving of the stepping motor is completely prevented.

Then, in the embodiment, after the final step pulse for the seek operation of the head has been supplied, the excitation in $\overline{AB}$ phase is performed for the excitation time t5 subsequent to elapse of the starting time t4 from supply of the step pulse, as shown in FIG. 2. The head is once forcibly driven downwardly in FIG. 5 to move out of the dead zone as indicated by the locus curve d in FIG. 5 and, thereafter, it enters the dead zone again at the predetermined speed and in the predetermined direction, followed by stopping at a certain position within the dead zone. Because the head is driven by the positioning excitation to move out of the dead zone and then enter the dead zone at the predetermined speed and in the predetermined direction irrespective of in which direction the head has entered the dead zone for the first time, as mentioned before, the head can be transferred to any target track with high accuracy.

Distribution characteristics of hysteresis measured by the inventors with the excitation time t5 as a parameter has proved that an extent of the hysteresis is sufficiently small at the setting value in the embodiment. It has also proved that the effect of reducing seek noise is remarkable at respective values of the step pulse ST and the excitation times t2, t3 set in the embodiment when the excitation time t1 is set to 0.5 ms.

With the embodiment as described above, since the stepping motor is excited to drive under the optimum conditions corresponding to respective intervals of the step pulses, the head can be operated with no seek noise, while avoiding a resonance phenomenon.

Note that although the excitation time of the 1-phase (A-phase) excitation in (1-2)-phase excitation for the stepping motor is switched over to either one of two options depending on the interval of the step pulses in the embodiment, the present invention is not limited to the embodiment illustrated here and the above excitation time may be switched over in three or more steps for finer control.

As described above, according to the present invention, an excitation time (end timing) of the 1-phase excitation in (1-2)-phase excitation for a stepping motor is changed depending on the pulse interval of step pulses, whereby the stepping motor is excited at the optimum timing for the pulse interval. Consequently, it is possible to greatly reduce seek noise in the seek operation of a head of a disk drive unit and also move the head for the seek operation.

What is claimed is:

1. A method for controlling a stepping motor having a rotor, said method comprising:
providing a series of step pulses from a controller;
measuring a step pulse time interval between succeeding step pulses; and
rotating said rotor by sequentially applying a plurality of current impulses of nonuniform duration to said stepping motor when one of said step pulses is provided, each current impulse applied at an associated excitation time whereby predetermined ones of said excitation times are varied on the basis of said measured step pulse time interval while predetermined other ones of said excitation times remain constant with respect to said measured step pulse time interval.

2. A method according to claim 1 wherein each of said current impulses occurs in one or more phases.

3. A method according to claim 2 wherein a one phase current impulse is varied on the basis of said measured step pulse time interval.

4. A method of reducing hysteresis effects in a disk drive, said disk drive comprising a disk having a plurality of concentric tracks, a stepping motor having a rotor coupled to a carriage having supported thereon a head to said head along a surface of said disk, said method comprising:
providing a step pulse from an external controller to said stepping motor;
rotating said rotor so that said head is positioned within a dead zone of one of said plurality of tracks;
rotating said rotor so that said head is slightly displaced from said dead zone along a predetermined direction to a position between said one of said plurality of tracks and an adjacent track; and
allowing said head to reenter said dead zone from said position between said one of said plurality of tracks and said adjacent track whereby said head stops at a predetermined position within said dead zone.

* * * * *